(No Model.)　　　　　　　　　　　　　　　　5 Sheets—Sheet 1.
H. B. WILLIAMS.
DRAFTING AND DESIGNING APPARATUS.

No. 461,625.　　　　　　　　　　Patented Oct. 20, 1891.

Witnesses.
E. G. Crannell.
E. N. Adams

Inventor.
Henry B. Williams,
R. F. Osgood,
Atty.

(No Model.)  5 Sheets—Sheet 2.

H. B. WILLIAMS.
DRAFTING AND DESIGNING APPARATUS.

No. 461,625. Patented Oct. 20, 1891.

Witnesses.
C. G. Cranwell
O. V. Adams

Inventor.
Henry B. Williams
pr R. F. Osgood
Atty.

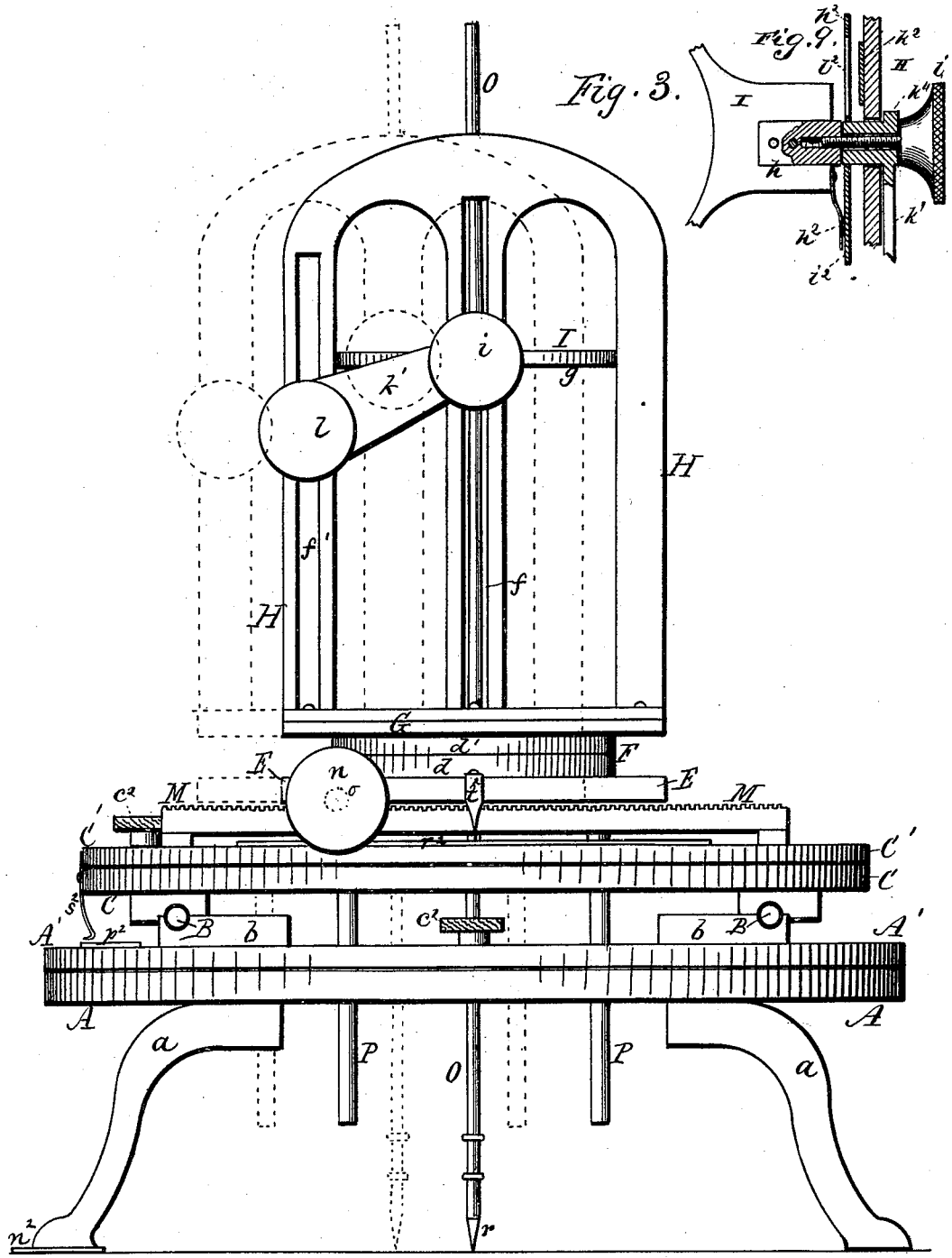

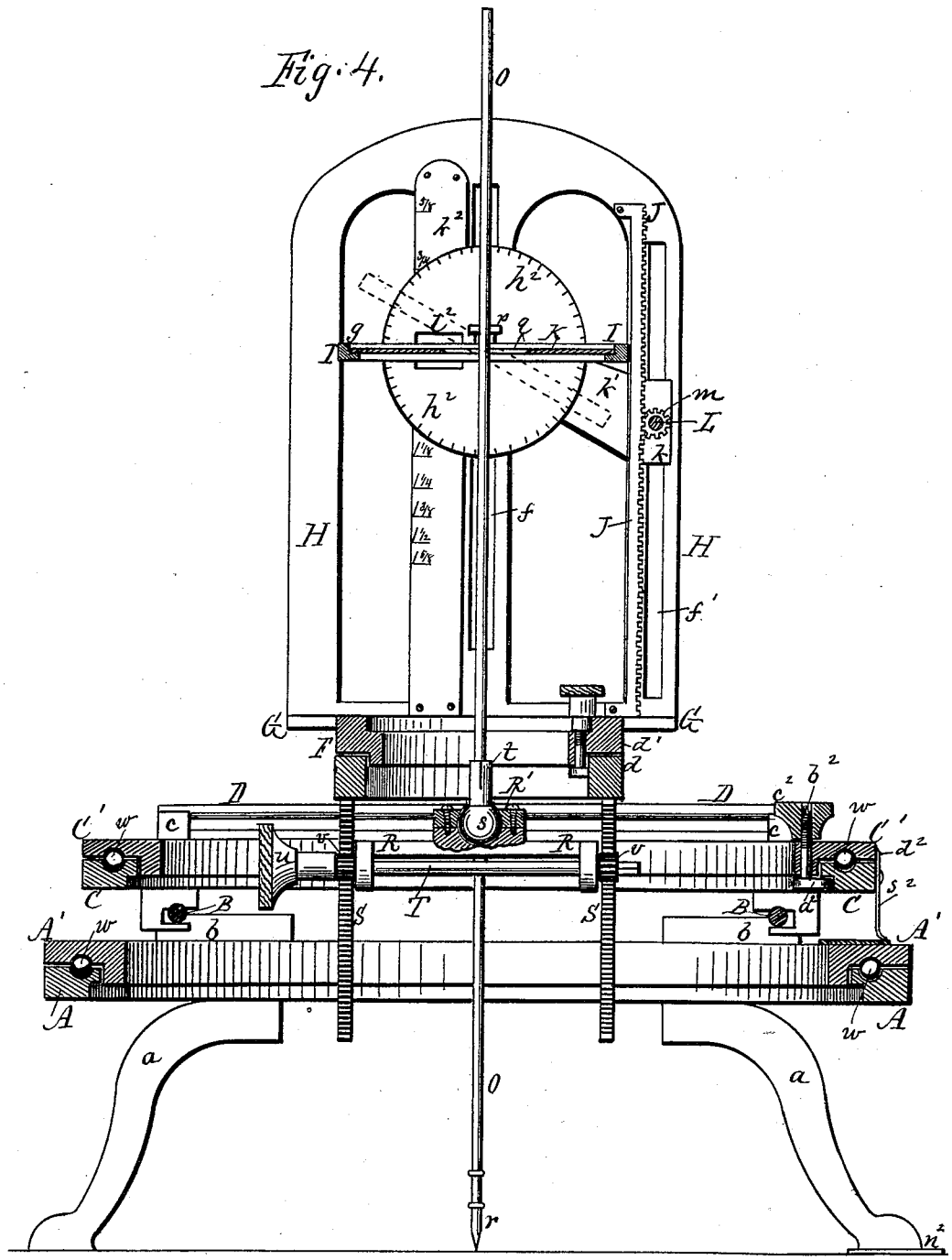

(No Model.) 5 Sheets—Sheet 5.
H. B. WILLIAMS.
DRAFTING AND DESIGNING APPARATUS.
No. 461,625. Patented Oct. 20, 1891.
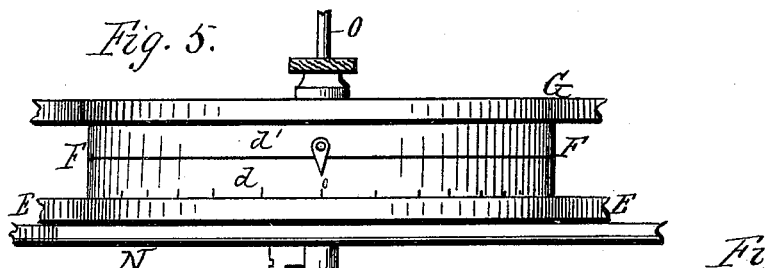
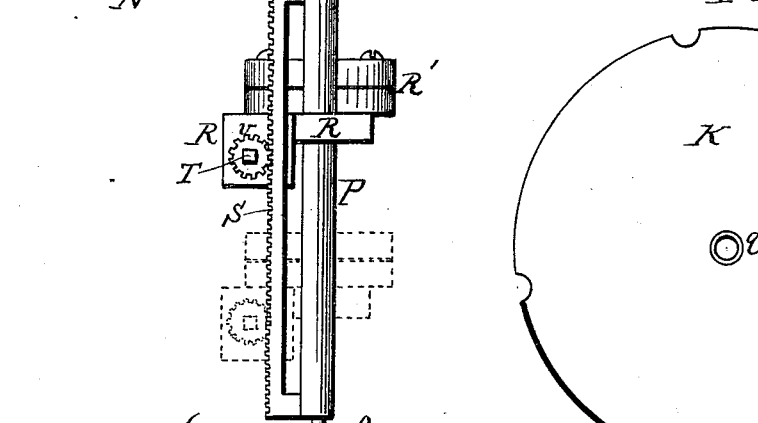
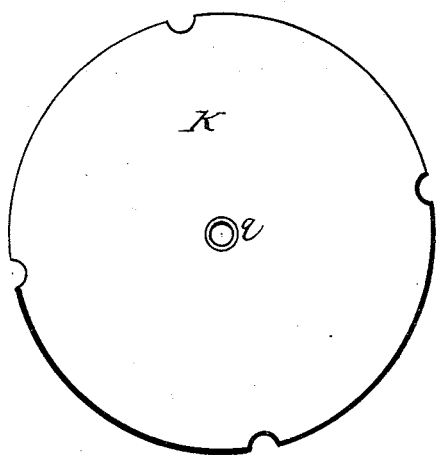
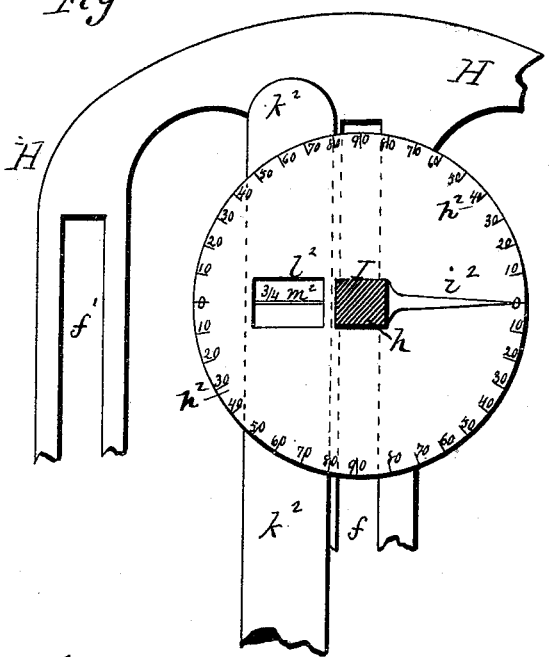
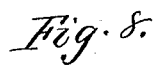
Witnesses.
C. G. Cramwell.
J. N. Adams.
Inventor.
Henry B. Williams,
per R. F. Osgood,
Atty.

UNITED STATES PATENT OFFICE.

HENRY B. WILLIAMS, OF ROCHESTER, NEW YORK, ASSIGNOR OF ONE-HALF TO LEMUEL A. JEFFREYS, OF SAME PLACE.

DRAFTING AND DESIGNING APPARATUS.

SPECIFICATION forming part of Letters Patent No. 461,625, dated October 20, 1891.

Application filed March 7, 1890. Serial No. 343,063. (No model.)

*To all whom it may concern:*

Be it known that I, HENRY B. WILLIAMS, of Rochester, in the county of Monroe and State of New York, have invented a certain new and useful Improvement in Drafting and Designing Apparatus; and I do hereby declare that the following is a full, clear, and exact description of the same, reference being had to the drawings accompanying this specification.

My improvement relates to apparatus for outlining drawings and designs, and is particularly applicable to the use of draftsmen and designers, being adapted to the making of figures in perspective, plans, and elevations, also designs of almost every conceivable form.

The invention consists in the combination of parts hereinafter described and claimed.

Figure 1:
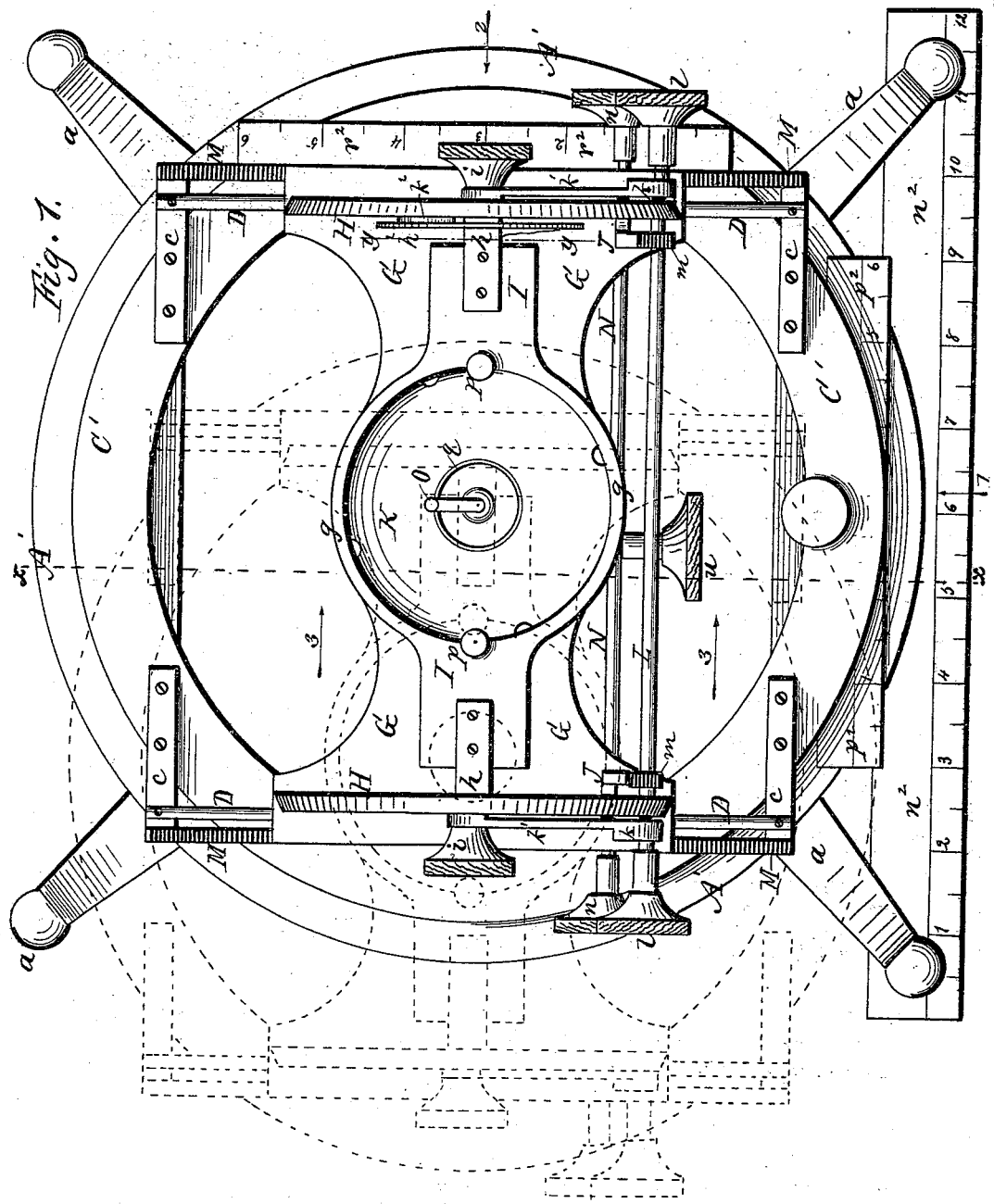
Figure 2:
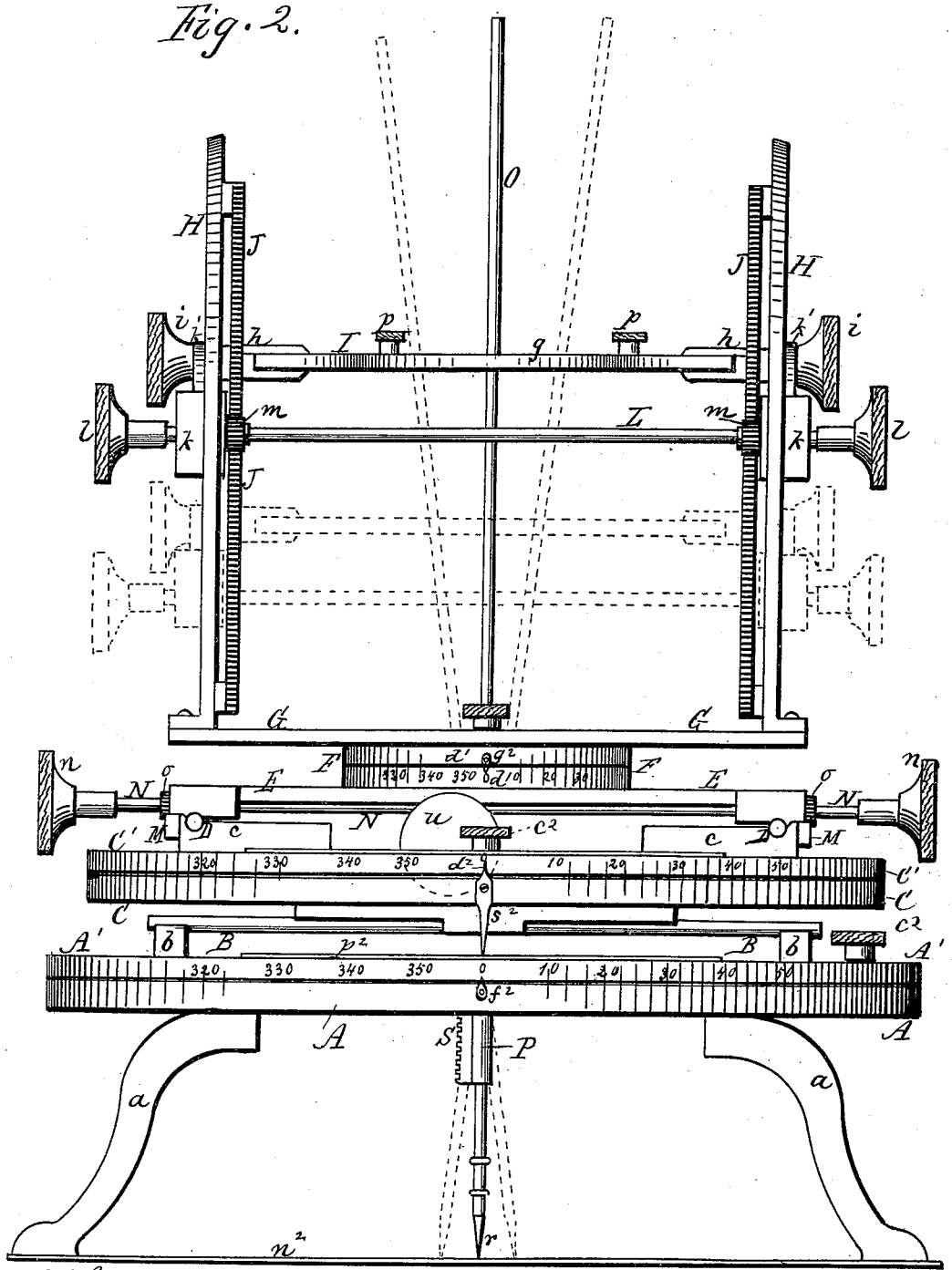

In the drawings, Figure 1 is a plan view of the apparatus. Fig. 2 is a side elevation looking in the direction of arrow 1 in Fig. 1. Fig. 3 is an end elevation looking in the direction of arrow 2, Fig. 1. Fig. 4 is a vertical cross-section in line $x$ $x$ of Fig. 1 and looking in the direction of arrow 3, Fig. 1. Fig. 5 is a side elevation of the central portion of the apparatus. Fig. 6 is an enlarged cross-section of Fig. 1 in line $y$ $y$, looking in direction of arrow 3 and showing the upper end of one of the supporting standards or frames in elevation. Fig. 7 is a plan view of one of the templets or patterns. Fig. 8 is an enlarged section of the ball-bearing for the pencil-shaft. Fig. 9 is a detail view showing a plan of one end of the templet-frame I and a horizontal section of the devices for clamping said frame at any adjustment.

A indicates a stationary ring supported by legs $a$ $a$, which rest on the paper or other surface on which the outline is to be drawn. A' is a similar ring mounted thereon and capable of rotary movement to any extent.

B B are rods forming ways secured on top of the ring A'. These rods are fixed to blocks $b$ $b$, resting on the ring or attached in any suitable way.

C is a third ring mounted on the ways B B and arranged to slide thereon in either direction from the center.

C' is a fourth ring mounted on ring C and arranged to rotate thereon in the same manner as the ring A' below. The rings A A' and C C' are arranged in pairs, the lower ring of each pair being relatively stationary and the upper ring revoluble.

D D are ways similar to the ways B B, mounted on the upper revoluble ring C', but standing at right angles to the ways B B. The attachment of the ways to the ring is made by blocks $c$ $c$, similar to the blocks $b$ $b$.

E is a plate forming a carriage or holder resting on top of the ways D D and movable out and in in either direction from the center. It will be seen that the whole upper structure, including the upper set of rings C C', is carried on the lower ways B B, while the carriage E, with the other parts hereinafter described, is carried on the upper ways D D, and that the movements on the two sets of ways are at right angles to each other.

F is a turn-table mounted centrally on the carriage E and consisting of two rings $d$ $d'$, which turn one on the other. The ring $d$ is attached to the carriage E, while the turning ring $d'$ forms the support for a bed-plate G, similar in form to the carriage E.

H H are two vertical plates forming standards fixed on opposite ends of the plate G and rising to suitable height. Each of these standards is provided with a vertical slot $f$ in the center and a similar slot $f'$ on one side for the attachment and vertical adjustment of the devices that operate the templet-frame.

I is the templet-frame, the same consisting of a plate having a central ring or socket $g$ to receive the templet or pattern K and provided at its ends with arms $h$ $h$, which extend outward to the standards H H.

J J are two vertical racks, one on each side of the machine, attached to the standards H H, adjoining the outer slots $f'$ $f'$.

L is a shaft extending across the machine and resting in boxes $k$ $k$, that slide up and down in the slots $f'$ $f'$. The ends of the shaft are provided with thumb-pieces $l$ $l$, by which the shaft is turned. The shaft has two pinions $m$ $m$, which engage with the racks J J. The boxes $k$ $k$ have arms $k'$ $k'$, which extend upward and end in slides $k^4$ $k^4$, that rest in the slots $f$ $f$ of the standards. $i$ $i$ are screws passing through the slides $k^4$ $k^4$ and entering the ends of the arms $h\ h$ of the templet-frame I. By loosening these screws $i\ i$ the templet-frame can be raised and lowered and can also be turned axially, so as to set the templet-frame at any incline vertically, and by tightening said screws again the templet-frame can be held at any adjustment. The vertical adjustment is indicated by the full and dotted lines, Fig. 2, and the axial adjustment by the full and dotted lines, Fig. 4.

M M, Figs. 1 and 3, are racks resting on the upper revolving ring $C'$.

N is a shaft extending crosswise of the machine and having its bearings in the ends of the carriage E. This shaft has finger-pieces $n\ n$, by which it is turned, also pinions $o\ o$, which engage with the racks M M. By turning the shaft N the carriage will be moved along, and by this means the adjustment of the carriage and the parts which it supports is produced. If desired, similar racks, shafts, and pinions to adjust the position of the upper set of rings on the lower set may be used; but under ordinary circumstances they are not necessary, as said parts will hold their position when simply slid along the ways. The templets K are thin disks of metal set into the ring or socket $g$ of the templet-frame I and secured by set-screws $p\ p$. The center of the templet has an eye or opening $q$, through which passes the shaft O, that carries the pencil-point or pen $v$. This opening really forms the pattern by which the design is produced, as the shaft is fulcrumed intermediately between the upper and lower ends, and the upper end, in being carried around against the edges of the opening, gives corresponding movement to the pencil end and describes the figure on the sheet below. The openings of the various templets used are made of different sizes and forms to correspond to the sizes and forms of the figure to be made.

P P, Figs. 3 and 5, are stiff rods forming ways projecting downward from the under side of the carriage E. R is a cross-bar sliding up and down on these ways, and $R'$ is a divided socket-piece in the center of the cross-bar, in which rests and freely turns a ball $s$. The shaft O passes through this ball and is held with gentle friction by a slitted shank $t$ of the ball. The shaft can be pushed through or drawn out of the ball at any time by exerting sufficient force, but the clamping action of the slitted shank is sufficient to sustain the shaft when drawn up away from the paper.

S S are two vertical racks attached to the ways P P.

T is a shaft passing through bearings in the ends of the cross-bar R and operated by a finger-piece $u$, which may fit on a square end of the shaft and be removable, if desired. The shaft is provided with two pinions $v\ v$, which engage with the racks S S. By turning the shaft it will be seen that the cross-bar R, and with it the socket $R'$, will be adjusted up or down, carrying with them the ball-bearing $s$, consequently changing the fulcrum of the shaft O, so as to bring it nearer to or farther from the pencil-point. These positions are indicated by the full and dotted lines in Fig. 5. The object of this adjustment will be presently explained. The close contact of the gears and the friction of the parts are usually sufficient to retain and hold the cross-bar R and socket $R'$ at any adjustment; but, if desired, a set-screw may be passed through bar R, clamping against one of the rods P to tighten the parts. The adjoining faces of each set of the rings A $A'$ C $C'$ are concentrically grooved and provided with friction-balls $w\ w$, Fig. 4, designed to lessen the friction between the rings and facilitate turning of the revolving rings. The revolving rings are clamped in place at any adjustment by suitable means, that shown in the drawings being a clamp $a^2$, attached to a screw $b^2$, on which screws a nut $c^2$, Fig. 4. The rings forming the turn-table are arranged in a similar way. The revoluble rings $A'\ C'$, also the removable ring of the turn-table, are laid off in scales of three hundred and sixty degrees, and pointers $d^2 f^2 g^2$ on the stationary parts are used in connection therewith to measure the adjustment of the parts when turned. A scale-disk $h^2$ is attached to the slide $k^4$, and the templet-frame is provided with a pointer $i^2$, the disk being laid off into quadrants of ninety degrees each, and the pointer acting in connection therewith to indicate different inclines, to which the templet-frame is turned in making of ellipses and ovals. Another vertical scale-plate $k^2$, Fig. 6, is attached to the standard behind the disk $h^2$, and an opening $l^2$ is made in the disk with a cross-wire $m^2$, which acts in connection with a scale marked on the vertical strip to indicate the length of ellipses and ovals as the templet-frame is adjusted up and down to different positions. In addition to the scales above described a straight scale $n^2$ is attached to the two front feet of the apparatus to measure distances in moving the apparatus to the right or left; also, two similar flat scales $p^2\ r^2$, attached, respectively, on top of the revoluble ring $A'\ C'$, standing at right angles to each other and used in connection with pointers $s^2\ t^2$ on the ring C and carriage E to indicate different adjustments of the upper set of rings over the lower one and the carriage over the upper set.

The apparatus as above constructed is adapted to making straight lines parallel with each other horizontally, vertically, or at any angle to each other around a whole circuit, or straight lines converging or diverging to or from a given point. To make such straight lines the pencil-shaft O is passed through a templet having a small central hole, such as shown in Fig. 7, which holds the shaft vertical and upright at all times. Therefore views in perspective may be made. To make simple circles the templet-frame I is adjusted in the horizontal position shown in full lines, Fig.

4, and the shaft O is passed through a templet having a hole of the proper size, the shaft being carefully kept in contact with the sides of the opening as it is passed around the circle. The pencil-point follows and makes a corresponding circular mark on the paper, but of a smaller size, corresponding with the lengths of the arms of the spindle on opposite sides of its fulcrum. To make an ellipse or oval the templet-frame I is turned to an incline, as shown by dotted lines, Fig. 4, and the quality of the ellipse or oval—that is, the width of its minor axis—depends upon the degree to which the frame is turned. This degree is gaged by the disk-scale $h^2$. The size of the ellipse or oval is graded by the vertical adjustment of the templet-frame and templet in the slots $f\,f'$, thereby increasing or decreasing the length of the upper arm of the spindle. It should be noted here that in order to make circles and ovals the templet must have a hole larger than the pencil-shaft, so that the latter will follow around the circuit at a distance from the center. This throws the lower end of the pencil-point correspondingly away from the center and makes it describe a circle or oval. The setting of the templet in an inclined position, as shown by the dotted lines, Fig. 4, shortens the minor axis of the figure described to the extent to which the guiding-templet is inclined. This adjustment is limited in its degree, however, as the templet cannot be adjusted so low as to make the smallest sizes of ellipses. To make the smaller sizes that cannot be made by the above-described adjustment the fulcrum of the shaft O is lowered by adjusting the ball that carries the shaft downward, which is done by running the socket-piece R' downward, as before descried, thereby shortening the short arm of the shaft and lengthening the long arm. By this means ellipses and ovals of very small size can be made. The universal adjustment of the apparatus is such that lines and figures of almost endless variety may be made. The dotted lines in Fig. 1 show the upper set of rings C C', and with them the carriage E and the parts it supports set off to one side. In this position the pencil can be made to do all the work it could do over the center. The carriage itself can be turned on the axis of the turn-table to any degree in the circle, either at the center of the machine or when set on one side, as shown in the dotted lines. Fancy designs, made up of circles, ovals, or curved lines, can therefore be made, each part correctly joined and the whole made perfect. The teeth of gear-wheels can be accurately laid out by using a templet of proper form.

The machine can be used effectively for making circles and ovals without adjusting the frame-work or supporting parts outward. This position is indicated by the full lines in Fig. 1, where all the parts are centered. In such case the apparatus forms a stand on legs supporting the templet-frame and templet at the top, and the circle or oval is made directly under the center of the machine. It can also be used effectively by simply adjusting the carriage that carries the templet-frame and templet out on its ways, leaving the rings below in their central position, in which case not only can circles and ovals be made under the center of the machine, but also to one side by moving the carriage outward. Straight lines can also be made in this way. In all such cases the supporting parts below the carriage serve simply as a stand to support the templet-frame and templet; but for universal use, where lines are to be made in all directions, the full adjustments of the machine are required.

Having described my invention, what I claim as new, and desire to secure by Letters Patent, is—

1. The combination, with a stand supported by legs, of a carriage mounted on the stand, movable out and in, a templet-frame and templet attached to bearings of the carriage, and a pencil or pen shaft passing through the templet and having a universal joint, forming a fulcrum located below the templet, as and for the purpose specified.

2. The combination, with a stand supported by legs, of a revoluble ring resting on the stand, ways supported by the revoluble ring, a carriage mounted on the ways, movable out and in, a templet-frame and templet supported by the carriage, and a pencil or pen shaft passing through the templet and having a universal joint, forming a fulcrum attached to the carriage, as and for the purpose specified.

3. The combination of two sets of rings, each of which consists of one stationary and one revoluble ring, ways between the two sets, on which the upper set is movable out and in, and a carriage supported by the upper rings and carrying a templet-frame and templet, as shown and described, and for the purpose specified.

4. The combination of two sets of rings, each of which consists of one stationary and one revoluble ring, ways between the two sets, on which the upper set is movable out and in, a carriage carrying a templet-frame and templet, and ways between the upper set of rings and the carriage, whereby the carriage is movable out and in, as herein shown and described.

5. The combination, with the carriage, of a templet-frame provided with a templet adjustable up and down in standards and capable of turning to different inclinations, as shown and described, and for the purpose specified.

6. The combination, with the templet-frame provided with journals that slide up and down in the supporting-standards, of a circular scale attached to the templet-frame and sliding up and down with it, and a pointer attached to the frame and operating in connection with the scale on the disk to indicate different inclinations of the frame, as herein shown and described.

7. The combination, with the templet-frame provided with journals that slide up and down in supporting-standards, one of which is provided with a scale, of a circular scale-disk attached to and sliding with the bearing that holds the frame, and a stationary scale-plate behind the disk, the disk being provided with an opening in front of the stationary scale-plate and having a central cross-wire, as shown and described, and for the purpose specified.

8. The combination of a supporting-stand, a revolving frame mounted thereon, a templet-frame and templet attached to the revolving frame and turning with it, and a pencil or pen shaft passing through the templet and provided with a universal joint, forming a fulcrum below the templet, as herein shown and described.

9. The combination of a supporting-stand, a carriage mounted thereon capable of axial turning movement, a templet-frame resting in standards supported by the carriage, a templet consisting of a disk with a central opening resting in the frame, and a pencil or pen shaft passing through the templet and having a universal joint, forming a fulcrum between the templet and pencil-point, as herein shown and described.

10. The combination, with a carriage mounted on a supporting-stand, of a templet-frame attached to standards, a templet attached to the frame having a central opening, a pencil-shaft, and a ball-bearing for the pencil-shaft, as herein shown and described.

In witness whereof I have hereunto signed my name in the presence of two subscribing witnesses.

H. B. WILLIAMS.

Witnesses.
   L. A. JEFFREYS,
   R. F. OSGOOD.